United States Patent [19]

Bergstrand

[11] 4,345,783
[45] Aug. 24, 1982

[54] PIPE COUPLING DEVICE

[76] Inventor: Gunnar M. Bergstrand, Stångholmsbacken 56, 12740 Skärholmen, Sweden

[21] Appl. No.: 199,508

[22] PCT Filed: Oct. 9, 1978

[86] PCT No.: PCT/SE78/00049
§ 371 Date: Jun. 9, 1980
§ 102(e) Date: May 27, 1980

[87] PCT Pub. No.: WO80/00740
PCT Pub. Date: Apr. 17, 1980

[51] Int. Cl.³ .............................................. F16L 25/00
[52] U.S. Cl. ..................................... 285/12; 285/101; 285/177; 285/346
[58] Field of Search ............... 285/101, DIG. 21, 346, 285/177, 12; 279/2 A, 4

[56] References Cited
U.S. PATENT DOCUMENTS

| 2,080,271 | 5/1937 | Hirst | 285/177 |
| 3,147,992 | 9/1964 | Haeber et al. | 285/DIG. 21 |
| 3,923,325 | 12/1975 | Slater | 285/312 |
| 4,162,092 | 7/1979 | Hayes | 285/177 |

FOREIGN PATENT DOCUMENTS

| 449092 | 12/1947 | Italy | 285/346 |
| 77510 | 10/1950 | Norway . | |
| 381926 | 12/1975 | Sweden . | |

Primary Examiner—David Arola

[57] ABSTRACT

To enable easy and quick coupling of a conduit to the end of a pipe, the device comprises a casing (1,5) having a replaceable, separate casing portion (5) with a resilient sleeve (4a,4b,4c), the radial dimensions of which are adapted to a particular pipe dimension. The sleeve is axially compressible between a stationary abutment (9) and a movable piston (11) having a channel (14) permitting the supply of pressurized fluid through the piston and into the end of the pipe (10a, 10b, 10c).

3 Claims, 4 Drawing Figures

PIPE COUPLING DEVICE

The invention relates to a pipe coupling device, especially for temporary connection of a conduit for pressurized fluid to a pipe section.

A pipe coupling device previously known from the U.S. Pat. No. 2,080,271 comprises a cylindrical, hollow casing or body to be permanently connected to a conduit for pressurized fluid. The casing is provided with a follower nut, which is threaded onto the casing and permits the insertion of two interior gaskets and an intermediate, metallic sleeve radially between the inside of the casing and the outside of the end of a pipe section fitted into the casing. Each gasket is of a standard cylindrical dimension and is formed of resilient material such as rubber or a rubber-like composition, whereas the intermediate sleeve is provided with external and internal recesses or shoulders for receiving each of the gaskets and preventing axial displacement of the latter, when the follower nut is screwed onto the casing. Moreover, the radial dimensions of the intermediate sleeve are chosen in view of the difference between the internal diameter of the casing and the external diameter of the pipe section to be coupled thereto. Thus, upon connection, the joint will be fluid tight. Moreover, standard casings and standard gaskets can be used together with radially different intermediate sleves for connecting pipe sections of different diameters.

However, the purpose of the present invention is to provide a coupling device which premits a simpler and quicker coupling operation, especially for temporary connection of the device to various pipe sections, having different diameters. Particularly, such a device is intended for use in connection with leakage tests of pipes, fluid vessels, heat exchangers, motor parts and other objects which have to be fluid tight. In such a test operation, the object to be tested is normally supplied with a pressurized fluid for a relatively short period of time so as to enable the testing of a large number of units in a given time period.

For this purpose, the coupling device is of the kind comprising a hollow casing for permanent connection to a conduit for the supply of pressurized fluid, a resilient sleeve being disposed in the casing and adapted to sealingly engage the cylindrical surface of the end of a pipe to be connected to the casing, and the device is characterized in that the resilient sleeve is mounted in a separate casing part, which is easily replaceable by a corresponding separate casing part having its own resilient sleeve, the radial dimensions of the respective sleeve being adapted to a particular pipe dimension, and that the sleeve, upon mounting of the separate casing part, is axially compressible between a stationary abutment and a piston, which is operable for axial displacement in the casing and provided with a channel permitting the supply of said pressurized fluid through said piston and into said pipe section.

It has turned out that the inventive device, apart from permitting an easy and quick coupling operation when shifting from one pipe dimension to another, has the advantage that the axial holding power, by friction between the radially expanded sleeve (upon axial compression) and the surface of the pipe, is maintained approximately at the same high level irrespective of the various pipe dimensions, in spite of the fact that the axial force, which is exerted by the pressure of the fluid and tends to axially separate the pipe from the coupling device, is heavily increased when shifting from a smaller to a greater diameter of the pipe.

The invention is explained further below with reference to the drawings illustrating an exemplary embodiment of the inventive device.

Figure 1:
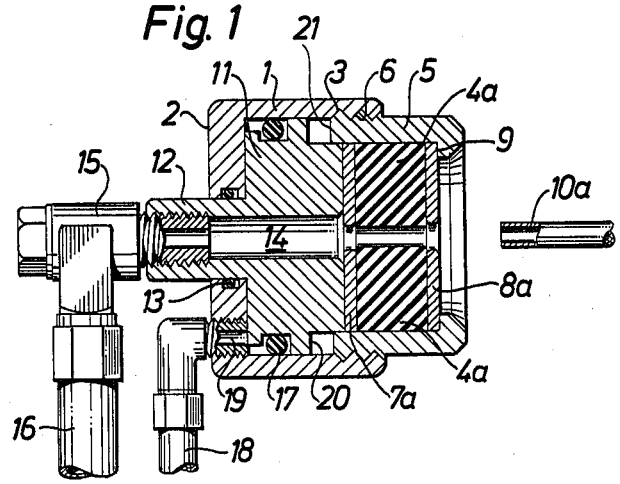
FIG. 1 shows in axial section a pipe coupling device according to the invention and the end of a pipe section to be connected thereto.
Figure 2:
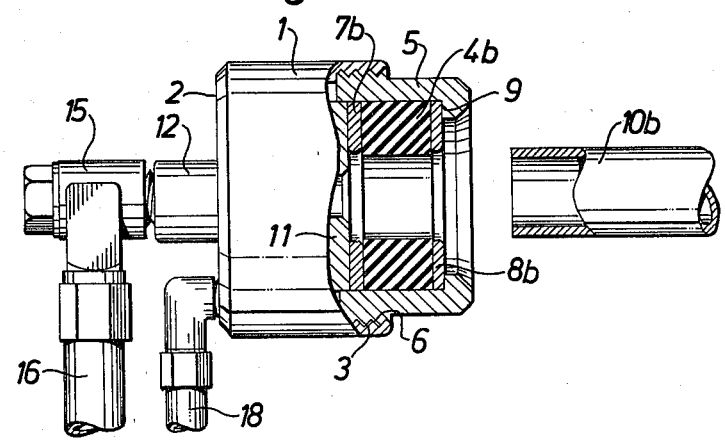
FIG. 2 shows a device corresponding to that of FIG. 1 but having a casing part with a resilient sleeve of a larger internal diameter adapted to fit onto a pipe section having a larger diameter than that of FIG. 1.
Figure 3:
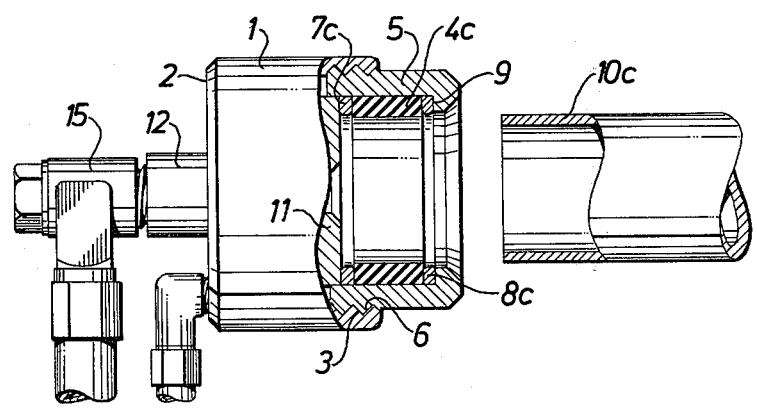
FIG. 3 shows a device corresponding to that of FIG. 1 and 2 but being adapted to a still larger diameter.

The pipe coupling device shown in FIGS. 1 to 3 comprises essentially a cylindric casing 1, preferably made of metal, such as aluminium or steel, having an end wall 2 at one end and an internal thread 3 at the other end. In accordance with the invention, a sealing sleeve $4a, 4b$ and $4c$, respectively, of a desired dimension is replaceably disposed in the casing 1, namely in a separate cylindrical casing portion 5 which, by means of an external thread 6, is threaded into the remaining portion of the casing 1 in the thread 3. The sealing sleeve $4a$, $4b$, $4c$ is made of elastic material, such as natural or synthetic rubber and is fitted between two rigid annular washers or plates $7a$ and $8a$, $7b$ and $8b$, $7c$ and $8c$, respectively, the radical dimensions of which correspond essentially to the dimensions of the sealing sleeve $4a, 4b$ and $4c$, respectively, though the internal diameter thereof is somewhat larger than that of the sealing sleeve. The annular plate $8a$, $8b$, $8c$ situated adjacent the free end of the casing portion 5 is seated against an internal shoulder or flange thereof, whereas the inner plate $7a, 7b, 7c$ situated at the opposite end of the sealing sleeve $4a, 4b, 4c$ is axially displaceable within the casing portion 5.

In order to effect an axial compression and, as a result thereof, a radial expansion of the sealing sleeve $4a, 4b$, $4c$ upon fitting the pipe coupling device onto the end of pipe $10a, 10b$ and $10c$, respectively, to be connected sealingly, a piston 11 is axially movable in the cylindrical casing 1. At one end, the piston 11 is provided with a narrower portion 12, which protrudes axially through an opening in the end wall 2 and is sealed relative to the latter by means of a sealing ring 13 (FIG. 1), e.g. an O-ring inserted into a corresponding annular groove in the surface defining the opening of the end wall 2. A central, cylindrical channel 14 extends axially through the piston 11 from one end thereof to the other. At the protruding, narrower piston portion 12 a pipe fitting 15 is permanently screwed into a thread at the outer end of the central channel 14, so that the channel 14 and the central hollow space of the sealing sleeve $4a, 4b, 4c$ communicate with a conduit 16 connected to the pipe fitting 15. The conduit 16 is preferably a flexible tube or hose connected to a fluid source (not shown) for the supply of pressurized fluid in the form of gas or liquid.

The inner, radially wider portion of the piston 11 forms the piston itself and is actuated by the pressure of a fluid present in the annular space defined between, on the one hand, the external surface of the piston 11 and, on the other hand, the inside of the casing 1 and its wall 2 at one side (to the left in FIG. 1) of a piston sealing ring 17. Via a conduit 18 and a port 19 in the end wall 2, a desired working pressure can be applied in the annular space so as to displace the piston 11 axially towards the sealing sleeve 4a, 4b, 4c, which under axial compression will expand radially and inwardly against the external surface of the pipe section 10a, 10b, 10c. As a result, one obtains a fluid tight seal and a frictional engagement, whereby the coupling device is held firmly onto the pipe section against the action of the axially separating force exerted by the pressurized fluid.

An essential advantage of the pipe coupling device according to the invention is that one can use the same casing 1, piston 11 and conduit 15, 16 and 18,19, respectively, for a substantial range of the diameter of the pipe section, as illustrated by the pipe sections 10a, 10b and 10c, whereby only the casing portion 5 and the sealing sleeve 4a,4b,4c need to be replaced as a unit (including also the plates 7a and 8a, 7b and 8b, 7c and 8c, respectively) when shifting to another dimension of the pipe section.

Figure 4:
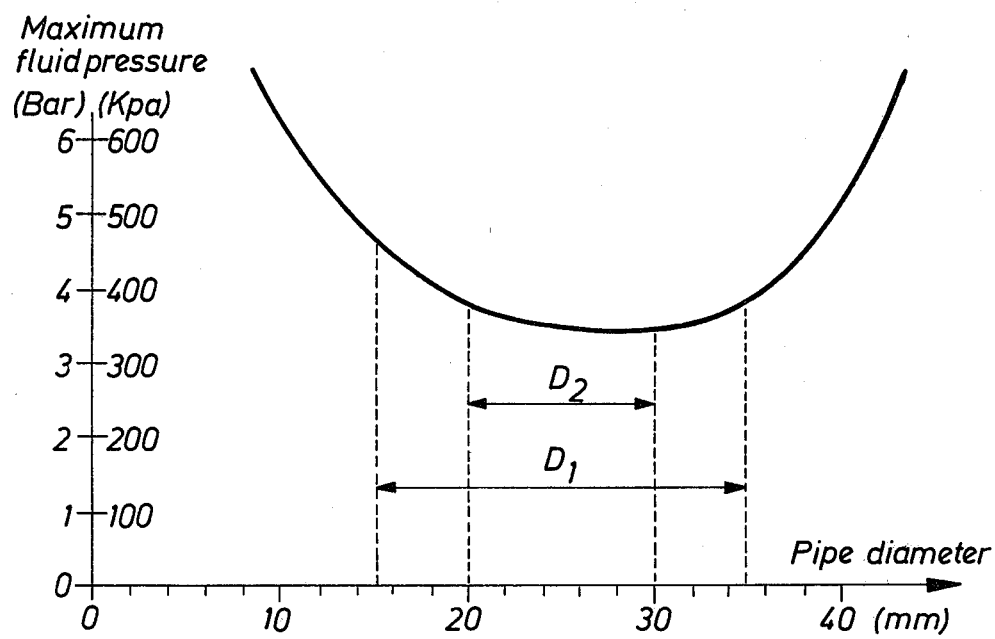
FIG. 4 is a diagram illustrating an essential advantage of the invention.

Moreover, tests have shown that the axial holding force due to the friction between the sealing sleeve 4,4b,4c and the pipe section 10a,10b,10c is favourably related to the axially separating force exerted by the pressure in the conduit 16. Thus, the holding force increases when increasing the pipe diameter (and the diameter of the sealing sleeve) within a rather large diameter region. This is shown in FIG. 4, which is a diagram illustrating the maximum working pressure (at which the sleeve 4a,4b,4c barely keeps its grip around the end of the pipe) as a function of the pipe diameter. Within the interesting diameter region $D_1$ (15 to 35 mm), particularly within the region $D_2$ (20 to 30 mm), the curve is relatively flat, i.e. the maximum working pressure is essentially independent of the diameter of the pipe. Thus, it is possibly to use a constant pressure of the fluid, especially air, by which the piston 11 is actuated via the conduit 18 and the port 19.

In principle, the pipe coupling device according to the invention can be modified for internal sealing of the pipe section 10a,10b, 10c, in which case the piston 11 is preferably provided with a portion protruding from the casing portion 5, whereas the sealing sleeve 4a,4b,4c is to be inserted between the outer end of the casing portion 5 and an external ring flange or collar on the protruding portion of the piston.

Furthermore, the interchangeable mounting of the casing portion at the remaining part of the casing can, of course, be achieved by other means than the threads, e.g. by bajonet-mount, a snap locking device or the like.

The sealing sleeve 4a,4b,4c may also be compressed in another way than exerting pressure on the piston. e.g. by means of a lever mechanism which is manually operable.

Moroever, it is possible to make use of the threads 3,6 of the casing portions of the embodiment shown in FIGS. 1 to 3 in such a way that the thread 6 is screwed only partly into the thread 3, whereas the piston 11 is provided with a stop face 20 co-operating with the inner end surface 21 of the casing portion 5, so as to form a stop means for the piston 11. If so desired, a rather high operating pressure could then be used, and the radial expansion of the sealing sleeve 4a,4b,4c can be controlled by an axial adjustment of the casing portion 5 relative to the casing.

I claim:

1. A pipe coupling device for connecting a conduit to a pipe section, said device comprising: a hollow casing, a resilient sleeve in said casing with a radially inner surface for sealingly engaging said pipe section, and a tubular element axially moveably arranged in said hollow casing for axially compressing and radially expanding said sleeve said casing including abutment means thereon for retaining said tubular element and resilient sleeve therewithin and for providing abutment means for said resilient sleeve during said compression thereof, said tubular element being adapted to be permanently connected to said conduit for the supply of pressurized fluid axially through the interior of the tubular element into said pipe section, said hollow casing comprising a readily detachable unit including a separate casing portion and said sleeve and being easily replaceable by a similar unit having a sleeve with a different radially inner surface adapted to a different pipe section dimension, and said tubular element being a piston with a radially widened portion forming a piston surface to be exposed to an actuation fluid for axially displacing said tubular element during coupling operation.

2. A pipe coupling device as defined in claim 1, wherein said detachable unit also comprises rigid ring plates inserted axially on opposite sides of said sleeve, the radial dimensions of said two ring plates corresponding essentially to the radial dimensions of said sleeve.

3. A pipe coupling device as defined in claim 1 or 2, wherein said separate casing portion of said detachable unit threadedly engages the remainder of said casing, and said piston and said separate casing portion having co-operating surfaces forming a stop means for said piston.

* * * * *